United States Patent [19]

Pierre et al.

[11] Patent Number: 4,844,681
[45] Date of Patent: Jul. 4, 1989

[54] LOAD-TRANSFERRING DEVICE, IN PARTICULAR FOR RAPIDLY TRANSFERRING PALLETIZED LOADS

[75] Inventors: Ravez Pierre, Orleans; Thole André, Jargeau, both of France

[73] Assignee: Unisabi S.A., Saint-Denis-De-L'Hotel, France

[21] Appl. No.: 104,870

[22] PCT Filed: Jan. 13, 1987

[86] PCT No.: PCT/FR87/00010
§ 371 Date: Sep. 11, 1987
§ 102(e) Date: Sep. 11, 1987

[87] PCT Pub. No.: WO87/04140
PCT Pub. Date: Jul. 16, 1987

[30] Foreign Application Priority Data

Jan. 14, 1986 [FR] France .................... 86 00435

[51] Int. Cl.⁴ ............................................. B65G 67/02
[52] U.S. Cl. ................................... 414/398; 356/399; 356/400; 356/401; 356/345; 33/286; 198/861.1; 901/47; 414/584

[58] Field of Search ............. 414/398, 400, 401, 572, 414/584, 273; 356/399, 138; 33/264, 286, 288; 198/586, 587, 861.1, 861.6; 901/47

[56] References Cited

U.S. PATENT DOCUMENTS

| | | | |
|---|---|---|---|
| 2,416,071 | 2/1947 | Shonnard | 33/264 |
| 3,710,961 | 1/1973 | Bomstein | 414/400 X |
| 3,727,777 | 4/1973 | Hanson | |
| 3,854,610 | 12/1974 | Carder | 414/401 X |
| 3,945,522 | 3/1976 | Suizu et al. | 414/345 X |
| 4,331,417 | 5/1982 | Shearer, Jr. | 414/273 |

FOREIGN PATENT DOCUMENTS 1338847 11/1973 United Kingdom .

*Primary Examiner*—Frank E. Werner
*Attorney, Agent, or Firm*—Curtis, Morris & Safford

[57] ABSTRACT

A load transfer device for palletized loads including a superstructure supporting a movable assembly having a plurality of teeth, and a lifting assembly associated with the teeth to provide for rapid load transfer. The transfer device includes a sighting mechanism to control the alignment of the superstructure, lateral jacks to correct the alignment of the superstructure, and a central pivot which authorizes a transverse displacement of the superstructure and/or rotation in its plane.

24 Claims, 5 Drawing Sheets

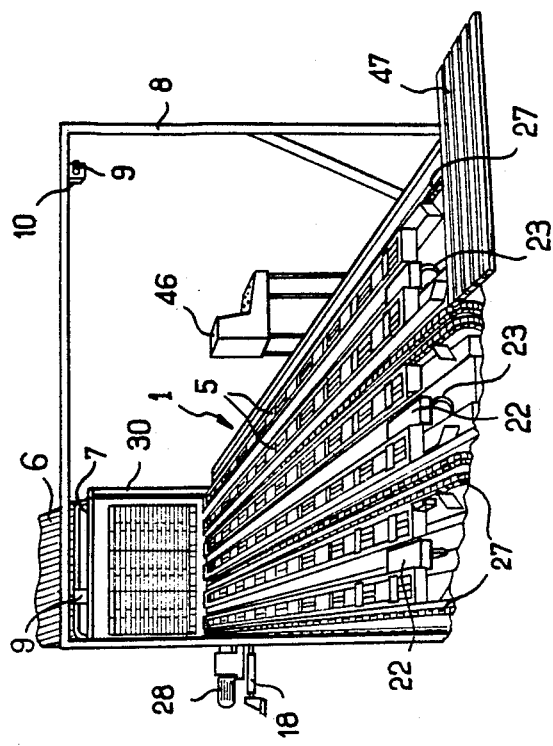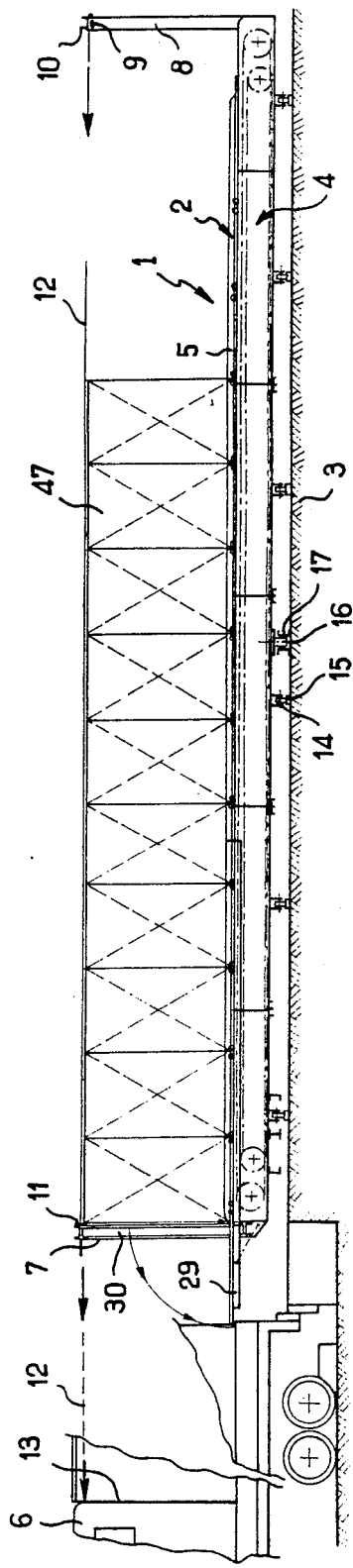

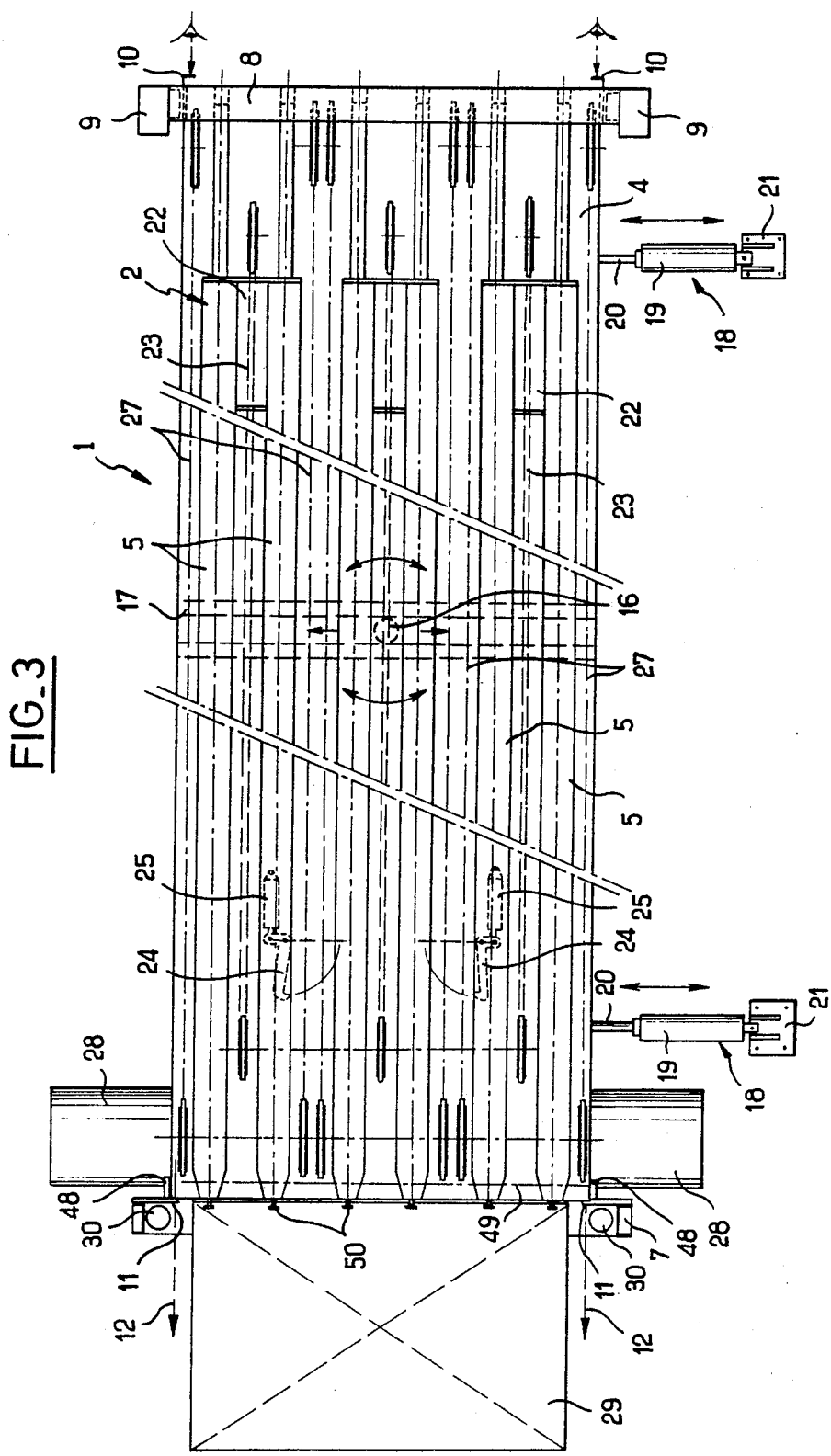

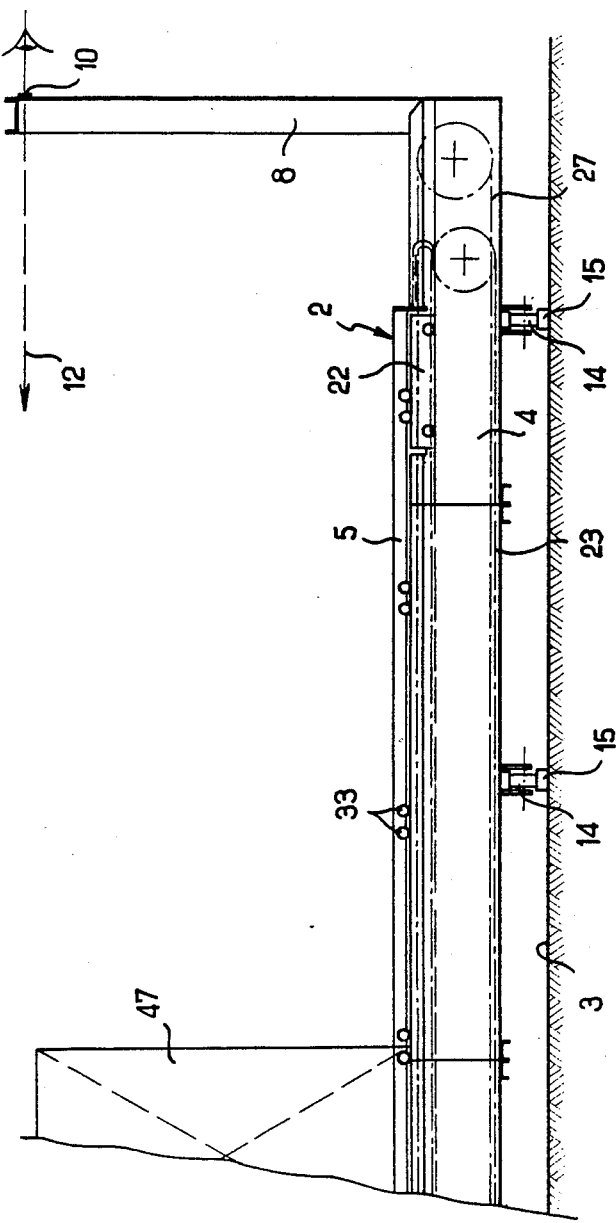
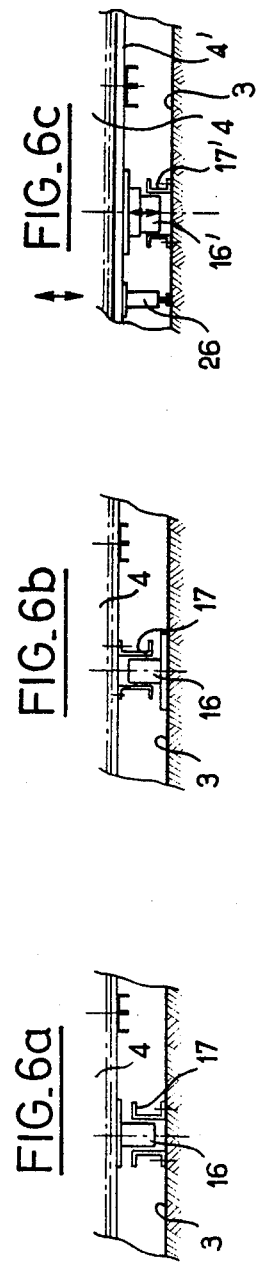

LOAD-TRANSFERRING DEVICE, IN PARTICULAR FOR RAPIDLY TRANSFERRING PALLETIZED LOADS

The present invention relates to transferring loads, in particular to rapidly transferring palletized loads transported on road vehicles.

The requirements for transferring palletized loads, i.e. loads stacked on trays generally made of wood and called "pallets" are continually increasing: loading and unloading operations must be performed in shorter and shorter times, while the loads being transferred are large (15 to 20 tons, for example). Further, both for reducing the time taken by such operations and for avoiding the danger inherent in rapidly manipulating heavy concentrated loads on pallets, it is desirable to develop load-transferring devices which enable as large a portion as possible of the loading and unloading operations to be performed automatically.

Prior devices which have been developed for providing high performance as specified above generally comprise an elongate superstructure disposed on a load-handling platform, said superstructure extending in the general transfer direction and supporting a moving assembly having a plurality of teeth which are substantially parallel to said direction, together with lifting means for raising or lowering said teeth relative to the superstructure in such a manner as to ensure that the teeth rapidly transfer a load by virtue of associated running means.

A good illustration of such devices is given in European patent application No. 0 103 999 or in French Pat. No. 2 219 094.

In general, guide equipment is provided on the surface over which or from which loads are transferred: in the above-mentioned European patent application, the floor of the vehicle has longitudinal tracks in which the teeth of the moving assembly slide, while in the above-mentioned French patent a similar disposition is provided on the bottom of a container, with projecting portions being defined by a floor which is crenellated in section.

With such devices, it is still necessary to guide palletized loads in the vehicle or the container when performing transfer operations, and more particularly when loading. In practice, a vehicle is never placed in a position of perfect alignment relative to the transfer device; thus, with ever increasing transfer strokes (up to about 15 meters, for example), a small degree of misalignment can have serious consequences for loading, and such a risk cannot be accepted if the transfer operations are to be automated.

The presence of such guidance equipment naturally gives rise to several drawbacks: the equipment must be adapted to each type of vehicle, or else such equipment must be provided during vehicle manufacture, which makes it difficult or even completely impossible to make use of un-specialized vehicles or containers, i.e. vehicles or containers having normally flat bottoms.

U.S. Pat. No. 3,727,777 describes a load-transferring device comprising a running assembly moving on a moving superstructure; the superstructure is supported on two transverse rails by means of four wheels disposed at the corners of the superstructure. Two electrical clutches allow one or other of the two pairs of wheels to move, thereby allowing the superstructure to be centered to a small extent relative to the vehicle. However, the longitudinal component of the forces is applied directly to the wheel shafts, thereby considerably reducing the practical advantage of the system.

Other systems have been made to facilitate load-acquisition operations, using structures which constitute flexible beams, having coupled running elements and pneumatic lifting means; a device of this type is illustrated, for example, in French Pat. No. 2 043 818. However, lateral positioning and alignment accuracy make this kind of equipment unsuitable for rapidly transferring relatively heavy palletized loads.

French Pat. No. 2 128 281 describes a system for automatically serving storage shelving. Signal emitters cooperating with an associated surface serve to position the carrying plate correctly. This document is an interesting illustration of automatic positioning for automating load transfer operations, however it contains no teaching on how to transfer loads rapidly using an elongate superstructure disposed on a load-handling platform and supporting a toothed moving assembly.

The main object of the invention is to provide a transfer device which does not require guidance equipment to be provided on the floor of the transport structure (road vehicle, container, etc.), thereby making it usable with any non-specialized structure.

Another object of the invention is to provide a device having high performance, both relating to the duration of loading and unloading operations, and relating to the weight capacity of the loads transferred.

Another object of the invention is to provide multiple adjustment possibilities allowing the invention to be adapted to a very wide range of vehicle types, without spoiling the time required for transfer operations by requiring the driver to spend a long time maneuvering, and in any case requiring limited accuracy during such maneuvers.

Another object of the invention is to provide a device which can easily be fitted with automatic control.

The invention relates more particularly to a load transfer device, in particular for transferring palletized loads tranported on road vehicles, the device comprising an elongate superstructure disposed on a load-handling platform, said superstructure extending in the general direction of load transfer and supporting the moving assembly having a plurality of teeth substantially parallel to said direction, said teeth providing rapid load transfer by virtue of associated running means, the device being characterized by the fact that it further comprises sighting means carried by the superstructure, for verifying the alignment of said superstructure relative to the vehicle, adjustment means disposed in the vicinity of each end of the superstructure for correcting the alignment of said superstructure by sideways displacement thereof relative to the load-handling platform, and connection means between the superstructure and the load-handling platform comprising a pivot and an associated transverse guide member, said connection means allowing the superstructure to move sideways and/or rotate in its plane, said sighting, adjustment, and connection means ensuring accurate positioning of transferred loads without requiring any guidance equipment to be provided on the vehicle floor.

Preferably, the sighting means comprise at least one member emitting light radiation, and preferably a laser member, together with associated front and back sighting apertures enabling the trace of the ray on the far end of the vehicle to be situated; in particular, the device may comprise front and rear gate frames mounted at each end of the superstructure and having the sighting means in the vicinity of their top angles for providing two references, with two side rolls level with the front gate frame and separated by a distance suitable for recentering palletized loads passing through said gate frame, if necessary.

In accordance with a simple and reliable arrangement, adjustment means for correcting the alignment of the superstructure are essentially constituted by two side jacks, disposed on one side of the superstructure in the vicinity of respective ends thereof; in particular, the body of each jack is hinged to a sole plate fixed to the load-handling platform, with the hinge axis being essentially vertical, the rod of said jack being connected to the superstructure.

Preferably, the pivot is mounted in a middle zone on the underside of the superstructure (or on the load-handling platform), said pivot being displaceable in a transverse slot fixed to said platform (or under said superstructure as the case may be), said pivot thus providing a longitudinal stop while allowing degrees of freedom in sideways translation and in vertical elevation; in a variant, the pivot is telescopic, being deployable in an essentially vertical direction.

In order to further improve the adaptability and the accuracy of operations, the device further comprises adjustment means disposed substantially level with the periphery of the superstructure for adjusting the height of said superstructure relative to the vehicle floor providing an essentially vertical displacement of the superstructure relative to the load-handling platform, together with an optional intermediate load-carrying superstructure disposed beneath the elongate superstructure, and having the application points of the height-adjusting means distributed along the length thereof; preferably, the height-adjusting means are telescopic hydraulic jacks or electrically controlled screw jacks.

In order to provide good coherence associated with proper guidance, the locking means are provided in the vicinity of the front ends of at least one of the teeth of the moving assembly, thereby enabling two adjacent ends to be interconnected; in particular, these locking means are articulated hooks, preferably controlled by means of hydraulic actuators, and the hooks are movable in a plane essentially parallel to the superstructure, and serve to lock the teeth in pairs.

Preferably, wheels are mounted under the superstructure (or on the load-handling platform), with said wheels running along rigid transverse paths provided on said platform (or under said superstructure, as the case may be).

It is also advantageous for the device to include a gate pivotally-mounted at the front of the superstructure for providing a transition gangway to the vehicle floor.

Other characteristics and advantages of the invention appear more clearly from the following description and the accompanying drawings relating to a particular embodiment and with reference to the figures, in which:

FIG. 1 is an elevation view of a transfer device in accordance with the invention, having palletized loads ready for loading on a road vehicle which is shown diagrammatically;

FIG. 2 is a perspective view showing a loading operation using the FIG. 1 device, with the view being from behind;

FIG. 3 is a plan view of the FIG. 1 device;

FIGS. 4 and 5 are elevation views of the device on a larger scale relating respectively to the rear and to the front portions thereof;

Figure 7:
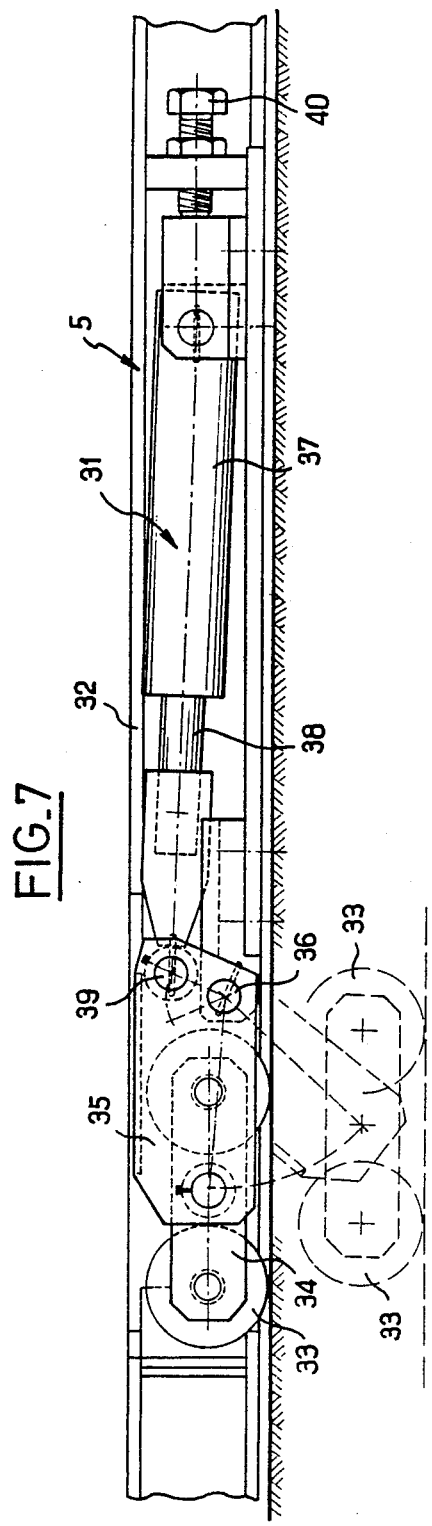
Figure 8:
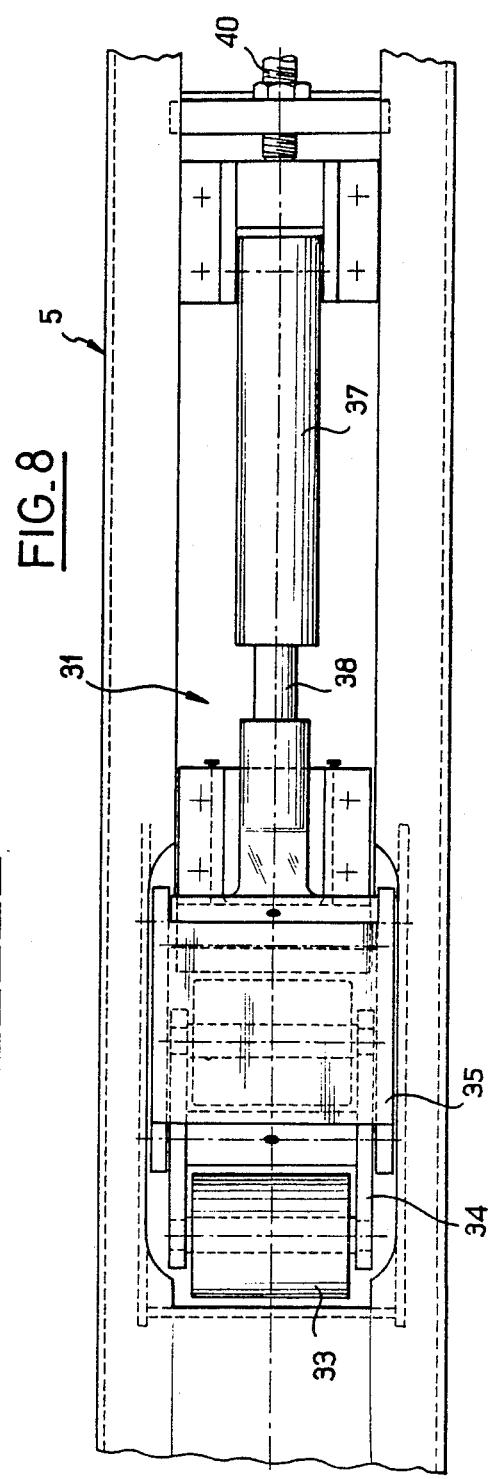
Figure 5:
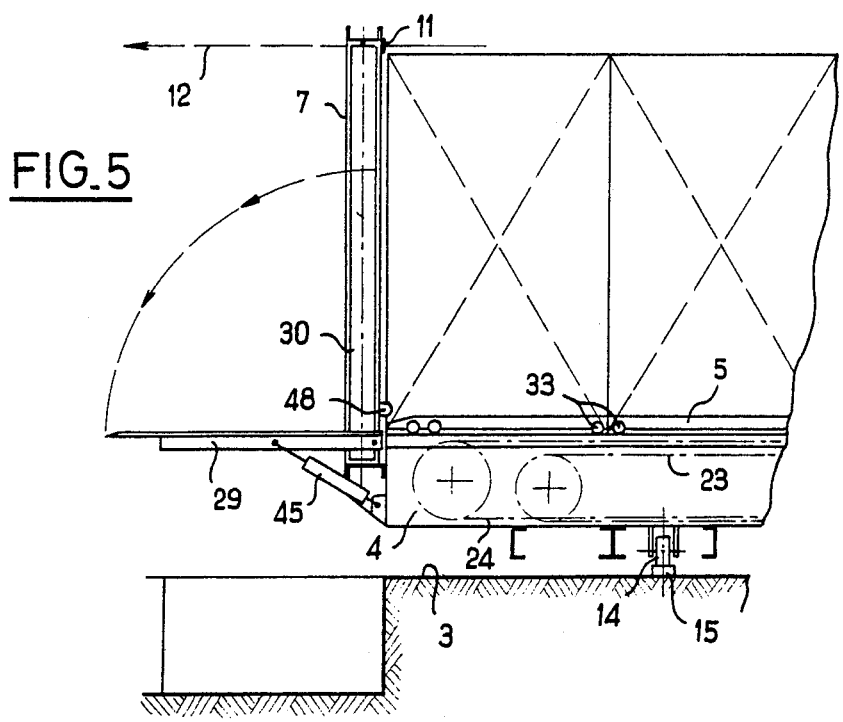
Figure 9:
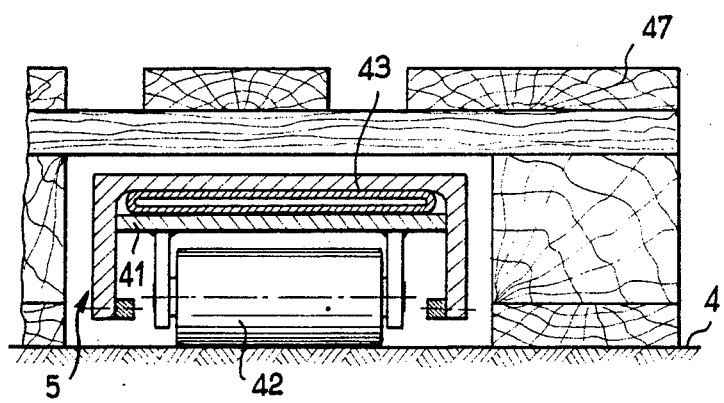
Figure 10:
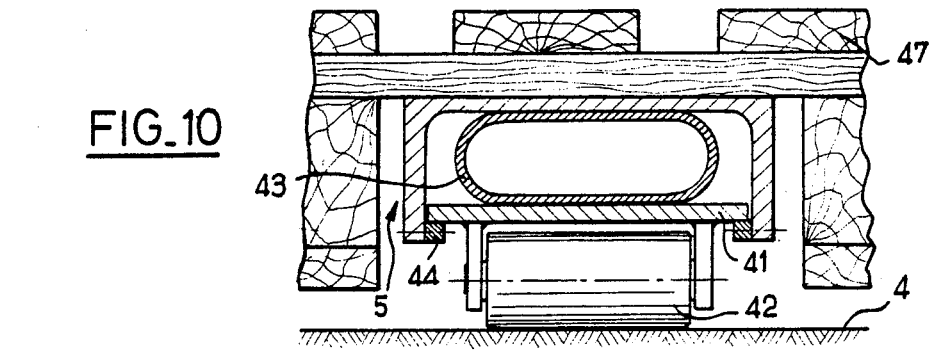

FIGS. 6a, 6b, and 6c show different embodiments of a central pivot, with FIG. 6c being a diagram showing an intermediate load-bearing superstructure associated with jacks for adjusting its height;

FIGS. 7 and 8 are a fragmentary elevation view and a fragmentary plan view respectively of a moving assembly tooth equipped with articulated lifting means under hydraulic control; and FIGS. 9 and 10 are a cross-section through another tooth variant in which the lifting means are inflatable.

FIGS. 1 and 2 show the general structure of a load transferring device in accordance with the invention, serving more particularly for rapidly transferring palletized loads transported on road vehicles. It should be observed that road transport is mentioned here merely by way of example, and that the invention is equally applicable to loading the insides of containers, and to loading other forms of transport, for example rail, sea, or air transport.

The transfer device 1 comprises an elongate superstructure 4 disposed on a platform 3 referred to as the loading or load-handling platform. This elongate superstructure extends in the general direction of transfer and supports a moving assembly 2 having a plurality of teeth 5 which are substantially parallel to the transfer direction. Lifting means which are described in greater detail below are provided for raising or lowering said teeth relative to the superstructure so that they can be used for rapidly transferring a load by virtue of associated running means.

According to an essential aspect of the invention, the transfer device 1 comprises sighting means carried by the superstructure 4 for monitoring the alignment of said superstructure relative to a vehicle 6 whose rear is brought into the vicinity of the load-handling platform. The device also includes adjustment means disposed in the vicinity of each end of the superstructure 4 to correct the alignment of said superstructure by displacing it sideways relative to the load-handling platform, together with means providing a connection between the superstructure and the platform, said connection means enabling the superstructure to be displaced transversally and/or optionally rotated in its plane.

Before describing these sighting, adjustment, and connection means in detail, it can already be seen very clearly that these various means can be used to accurately position loads being transferred withouy there being any need to provide any guidance equipment whatsoever on the vehicle floor. This means that it is possible to use any type of un-specialized transport structure, and in particular to use road vehicles whose load-supporting floors are of conventionl flat shape.

Reference can now usefully be made to FIGS. 3 to 5 and 6a which illustrate the structure of the sighting, adjustment, and central connection means to a larger scale and which are now described in greater detail.

The sighting means comprise at least one light ray emitting member, and it is preferable to use a laser member. Two gate frames 7 and 8 are mounted on the superstructure 4 respectively at the front and at the back thereof, in particular for supporting the sighting means. Respective positioning lasers 9 are thus provided at the top of the rear gate frame 8 in the vicinity of each corner thereof, and front and rear sighting apertures 10 and 11 are used for situating the trace of a light ray 12 on the far end of the vehicle 13. This arrangement thus provides two references, thereby enabling the load transporting device to be accurately aligned relative to the longitudinal direction of the vehicle. It is naturally possible to use other types of sighting means, but it is preferable to use a positioning laser because of its accuracy and because of its ease of use.

When incorrect alignment of the superstructure is detected, using the above sighting means, it is necessary to be able to provide the necessary correction prior to proceeding with loading or unloading operations.

To this end, the superstructure 4 which stands on the platform 3 via wheels 14 running in rigid associated thrust tracks 15 provided transversally on said platform therefore provide a certain degree of freedom for sideways movement. Naturally, the wheels could be mounted on the platform 3 and the rigid thrust tracks on the superstructure 4 using a ball-plate type of mount.

However, the degrees of freedom of the superstructure 4 relative to the platform 3 are limited by the presence of a connection or connection means provided in this case by a central pivot 16 mounted under the superstructure, said pivot being capable of moving in a transverse slot 17 fixed to the platform thereby preventing the superstructure from moving longitudinally while still allowing it degrees of freedom in lateral translation, rotation in its plane, and vertical elevation. Here again, an inverse disposition could be provided by mounting the pivot on the platform and by fixing the guide slot under the superstructure, as illustrated in FIG. 6b, with FIG. 6a corresponding to the variant shown in the other figures. In another possible variant, a pivot could be disposed at the front of the superstructure and be received in an associated housing to enable the superstructure to rotate in its plane without moving transversely.

The adjustment means serve to correct the alignment of the superstructure relative to the vehicle and are best seen in FIG. 3. In this case they are essentially constituted by two side jacks 18 disposed on the same side of the superstructure and in the vicinity of respective ends thereof. Preferably, the body 19 of each jack is hinged to a sole plate 21 which is fixed to the load-handling platform, with the hinge axis being substantially vertical, and the rod 20 of said jack being connected to the superstructure at a point disposed on the bottom thereof (not shown).

When the alignment of the superstructure is adjusted, with the help of the above-mentioned sighting means, the longitudinal component of the applied forces is taken up by the central pivot 16 coming into abutment with one or other of the two faces of the transverse slot 17, and this happens in all positions of the superstructure, thereby enabling particularly fine adjustment of its alignment solely by controlling the two side positioning jacks 18. This possibility of transverse adjustment monitored with the help of the sighting means provides considerable advantages in practice: the vehicle driver need only reverse the vehicle with an average degree of accuracy, with the necessary alignment then being retrieved by correcting the relative position of the superstructure relative to the vehicle, with said alignment being naturally a necessary condition for loading and unloading operations to take place properly.

Since the principle of using a moving assembly having teeth is relatively conventional when transferring loads, its component parts are outlined only briefly. The transfer teeth 5 are arranged like forks with a rear drive carriage 22 being capable of running along an associated track of the superstructure 4, and with drive being provided by means of an associated chain 23, preferably by being mounted on a common transverse shaft. The teeth 5 are provided all along their length with running means enabling them to be easily displaced over the superstructure in a direction parallel to the load-transfer direction. These running means are generally associated with lifting means enabling the teeth to be raised or lowered, as described below with reference to FIGS. 7 to 10.

Further, locking means are advantageously provided in the vicinity of the front ends of at least some of the teeth of the moving assembly, so as to interconnect two adjacent ends of said teeth. Said locking means ensure proper coherence of the assembly and proper front guidance of the teeth, and are provided in this case by articulated hooks 24, which are preferably controlled by double-action hydraulic actuator means 25. These hooks are disposed beneath the teeth and are movable in a plane essentially parallel to the superstructure, thereby avoiding any risk of these members coming into abutment against a portion of the superstructure during transfer operations. An electrical contactor is preferably provided to provide an indication on a central control console 46 (see FIG. 2) that the teeth have actually been locked.

It is also possible to provide additional adjustment of superstructure position by providing adjustment means disposed substantially at the periphery of the superstructure for adjusting the height of said superstructure relative to the vehicle floor, making use of essentially vertical displacement relative to the load-handling platform. Given the large mass that needs to be raised, it is preferable to use telescopic hydraulic jacks rather than electrically controlled screw jacks. In practice, an intermediate load-carrying superstructure 4' is then provided disposed beneath the elongate superstructure 4 and having application points for the height-adjusting means 26 distributed therealong, as can be seen in FIG. 6c, which figure also shows a further possible variant for the central pivot 16' which may be telescopic, being extensible in an essentially vertical direction and having an active end which moves freely in a transverse slot 17' (allowing movement in transverse translation and in vertical elevation). Two front jacks and two rear jacks may be provided with the jacks being synchronously controlled in pairs, thereby enabling the longitudinal inclination of the superstructure to be easily adjusted, with the necessary angular range being a few degrees.

The displacement of palletized loads over the superstructure above the teeth 5 is provided in entirely conventional mnner using chains 27 arranged on either side of the pairs of teeth, with the chains 27 being driven by a control motor 28 acting on a shaft common to all of the chains 27. Thus, FIG. 3 shows six handling chains 27, and three carriage drive chains associated with teeth 23. On FIG. 3 only, end-of-stroke contactors 50 can be seen disposed at the front end of each of the teeth. These contactors enable the progress of the teeth to be stopped immediately, thereby providing additional safety in the event of a person being inadvertently on the vehicle floor during loading.

Each of the teeth 5 advantageously comprises lifting means distributed along its length, with the amplitude of said means being such that in their low position, the teeth pass freely under the pallets between the end lugs thereof, whereas in their high position, the pallets are raised for transfer purposes above their associated drive chains 27.

FIGS. 7 and 8 show a first type of lifting means which can be fitted to the teeth 5 (this type of lifting means corresponds to that which is partially visible in the perspective view of FIG. 2).

A succession of lifting assemblies 31 is thus disposed inside a main bar 32 constituting the outside structure of the teeth. Each assembly 31 comprises a pair of wheels 33 having a support plate 34 mounted to rock on a chassis 35 which is itself hinged either directly or indirectly to the main bar 32 (about axis 36), with a preferably hydraulic jack 37 controlling tilting of the chassis 35 by means of its rod 38 being hinged to said chassis (about axis 39), with the position of the body of the jack 37 inside the tooth being itself adjustable by adjustment means 40 so as to enable the amplitude of the rocking motion of the wheel-carrying plate between its high and low positions to be accurately adjusted. The ducts associated with the jack run along the inside of the bar and may be fixed, for example, to the corresponding drive carriage. The power point may be disposed, for example, in a mid-portion of the superstructure (not shown).

A simpler variant is shown in FIGS. 9 and 10. In this case, each plate 41 supporting wheels 42 is capable of sliding freely inside the main bar constituting the tooth 5. An inflatable tubular element 43, for example made of rubberized cloth, controls the raising or the lowering of the tooth. Abutments 44 mounted on the main bar can be seen for limiting the maximal extension of the lifting motion.

These lifting and running means associated with each of the teeth merely constitute equipment fitted to a load-transferring device in accordance with the invention, and naturally other existing techniques could be used instead. In particular, teeth could be provided having a constant level without the above-mentioned lifting means, in which case wheels may be provided longitudinally distributed along the teeth and capable of taking up a high position or a low position by virtue of a cam system.

The equipment fitted to a load-transferring device in accordance with the invention may be completed by providing a pivoting gate 25 at the front of the superstructure 4, with gate motion being controlled by means of an actuator 45. This gate serves as a transition gangway to the vehicle 4 during all transfer operations. Two rolls 30 having essentially vertical axes are provided along the risers of the front gate frame 7. The gap between the rolls 30 is selected in such a manner that, where necessary, off-center palletized loads are re-centered as they pass through the front gate frame 7. A photoelectric cell 48 can be observed at the bottom of the front gate frame 7 in FIGS. 3 and 5, and this cell serves to stop palletized loads from moving when the ray 49 is interrupted.

A load-transferring device in accordance with the invention can easily be used for providing automated control of various loading or unloading operations. The control console 46 enables an operator to verify that the operations are taking place properly while keeping out of the zone where loads are being transferred rapidly.

After a vehicle that needs loading or unloading has been put into place, the alignment of the superstructure 4 is checked using the sighting means, and if necessary it is corrected by using the side jacks 18, and this adjustment may also be accompanied by an adjustment of the level of the superstructure when means such as the jacks 26 are provided. The pairs of teeth are also locked together by means of the associated hooks, and this operation is advantageously performed simultaneously with the operation of raising or lowering the palletized loads, thereby enabling the same hydraulic control to be used.

When loading, loads 47 are brought successively onto the superstructure and are driven by the associated chins towards the front gate frame 7, and their progress is automatically stopped when the ray 49 to the photoelectric cell 48 is interrupted. All of the teeth are then simultaneously raised and are simultaneously locked, so that subsequently advancing the moving assembly then causes the necessary loading operation to take place in a single pass since the teeth are returned rearwardly after being lowered and unlocked. Unloading takes place in reverse manner, beginning by verifying and optionally adjusting the lateral and vertical positions of the superstructure, after which the teeth are advanced under the pallet to be unloaded and are then raised and locked, with unloading then taking place in a single pass.

By way of example, a load-transferring device in accordance with the invention is capable of automatically transferring 24 pallets each weighing one ton or thirty pallets each weighing 500 kg in a period of less than three minutes. This transfer takes place completely safely even though the vehicle is not provided with guidance equipment as has always been necessary for prior art transfer devices. The operator can monitor transfer operations from a central control console having indicators thereon for the various checks enabling the operator to verify that operations are taking place properly at any moment.

The invention is not limited to the embodiment described above, but covers any variant making use of the essential characteristics specified in the claims, but with equivalent means.

In particular, for the connection or link means, equivalent link means other than the above-described pivot could be selected, and it is not essential for said means to be located in the middle of a superstructure. For example, it could be offset to a greater or lesser extent towards one or other of the ends of the superstructure. Similarly, the adjustment means could include a different arrangement of side jacks or equivalent members.

We claim:

1. A load-transferring device, in particular for rapidly transferring palletized loads transported on road vehicles, the device comprising an elongate superstructure disposed on a load-handling platform, said superstructure extending in the general direction of load transfer and supporting the moving assembly having a plurality of teeth substantially parallel to said direction, said teeth providing rapid load transfer by virtue of associated running means, the device being characterized by the fact that it further comprises sighting means carried by the superstructure, for verifying the alignment of said superstructure relative to the vehicle, adjustment means disposed in the vicinity of each end of the superstructure for correcting the alignment of said superstructure by sideways displacement thereof relative to the load-handling platform, and connection means between the superstructre and the load-handling platform comprising a pivot and an associated transverse guide member, said connection means allowing the superstructure to move sideways and to rotate in a substantially horizontal plane, said sighting, adjustment, and connection means ensuring accurate positioning of transferred loads without requiring any guidance equipment to be provided on the vehicle floor.

2. A device according to claim 1, characterized by the fact that the sighting means comprises at least one member emitting light radiation, and a laser member, together with associated front and back sighting apertures enabling the trace of the ray to be situated on the far end of the vehicle.

3. A device according to claim 2, characterized by the fact that it comprises front and rear gate frames mounted at each end of the superstructure and having the sighting means in the vicinity of their top angles for providing two references.

4. A device according to claim 3, characterized by the fact that the front gate frame includes two side rolls having essentially vertical axes, with the gas therebetween being suitable for re-centering palletized loads passing through said gate frame.

5. A device according to claim 1, characterized by the fact that the adjustment means for correcting the alignment of the superstructure are essentially constituted by two side jacks, disposed on one side of the superstructure in the vicinity of respective ends thereof.

6. A device according to claim 5, characterized by the fact that the body of each jack is hinged to a sole plate fixed to the load-handling platform, with the hinge axis being essentially vertical, the rod of said jack being connected to the superstructure.

7. A device according to claim 1, characterized by the fact that the pivot is mounted in a middle zone on the underside of the superstructure, said pivot being displaceable in a transverse slot fixed to said platform, said pivot thus providing a longitudinal step while allowing degrees of freedom in sideways translation and in vertical elevation.

8. A device according to claim 7, characterized by the fact that the pivot is telescopic, being deployable in an essentially vertical direction.

9. A device according to claim 1 characterized by the fact that it also comprises further adjustment means disposed substantially level with the periphery of the superstructure relative to the vehicle floor providing an essentially vertical displacement of the superstructure relative to the load-handling platform.

10. A device according to claim 9, characterized by the fact that it comprises an intermediate load-carrying superstructure disposed beneath the elongate superstructure, and having height-adjusting means distributed along the length thereof.

11. A device according to claim 9, characterized by the fact that the height-adjusting means are telescopic hydraulic jacks or electrically controlled screw jacks.

12. A device according to claim 1, characterized by the fact that locking means are provided in the vicinity of the front ends of at least some of the teeth of the moving assembly, thereby enabling front ends of adjacent teeth to be interconnected.

13. A device according to claim 12, characterized by the fact that the locking means are articulated hooks controlled by means of hydraulic actuators.

14. A device according to claim 13, characterized by the fact that the hooks are movable in a plane essentially parallel to the superstructure, and serve to lock the teeth in pairs.

15. A device according to claim 1, characterized by the fact that wheels are mounted under the superstructure, with said wheels running along rigid transverse thrust paths provides on said platform.

16. A device according to claim 1, characterized by the fact that it includes a gate pivotally-mounted at the front of the superstructure for providing a transition gangway to the vehicle floor.

17. A load-transferring device, in particular for rapidly transferring palletized loads transported on road vehicles, the devices comprising an elongated superstructure disposed on a load-handling platform, said superstructure extending in the general direction of load transfer and supporting the moving assembly having a plurality of teeth substantially parallel to said direction, said teeth providing rapid load transfer by virtue of associating running means, the device being characterized by the fact that it further comprises sighting means carried by the superstructure, for verifying the alignment of said superstructure relative to the vehicle, adjusting means disposed in the vicinity of each end of the superstructure for correcting the alignment of said superstructure by sideways displacement thereof relative to the load-handling platform, and connection means between the superstructure and the load-handling platform comprising a pivot and associated transverse guide member, said connection means allowing the superstructure to move sideways and/or to rotate in a substantially horizontal plane, said sighting, adjustment, and connection means ensuring accurate positioning of transferred loads without requiring any guidance equipment to be provided on the vehicle floor, wherein the sighting means includes at least one member emitting light radiation, and a laser member together with associated front and back sighting apertures enabling the trace of the ray to be situated on the far end of the vehicle.

18. A device according to claim 17, characterized by the fact that it comprises front and rear gate frames mounted at each end of the superstructure and having the sighting means in the vicinity of their top angles for providing two references.

19. A device according to claim 17, characterized by the fact that the front gate frame includes two side rolls having essentially vertical axes, with the gap therebetween being suitable for re-centering palletized loads passing through said gate frame.

20. A load-transferring device, in particular for rapidly transferring palletized loads transported on road vehicles, the device comprising an elongate superstructure disposed on a load-handling platform, said superstructure extending in the general direction of load transfer and supporting the moving assembly having a plurality of teeth substantially parallel to said direction, said teeth providing rapid load transfer by virtue of associated running means, the device being characterized by the fact that it further comprises sighting means carried by the superstructure for verifying the alignment of said superstructure relative to the vehicle, adjustment means disposed in the vicinity of each end of the superstructure for correcting the alignment of said superstructure by sideways displacement thereof relative to the load-handling platform, and connection means between the superstructure and the load-handling platform comprising a pivot and an associated transverse guide member, said connection means allowing the superstructure to move sideways and/or to rotate in a substantially horizontal plane, said sighting, adjustment, and connection means ensuring accurate positioning of transferred loads without requiring any guidance equipment to be provided on the vehicle floor, wherein the pivot is mounted in a middle zone on the underside of the superstructure, said pivot being displaceable in a transverse slot fixed to said platform, said pivot thus providing a longitudinal step while allowing degrees of freedom in sideways translation and in vertical elevation.

21. A device according to claim 20, characterized by the fact that the pivot is telescopic, being deployable in an essentially vertical direction.

22. A load-transferring device, in particular for rapidly transferring palletized loads transported on road vehicles, the device comprising an elongate superstructure disposed on a load-handling platform, said superstructure extending in the general direction of load transfer and supporting the moving assembly having a plurality of teeth substantially parallel to said directin, said teeth providing rapid load transfer by virtue of associated running means, the device being characterized by the fact that it further comprises sighting means carried by the superstructure for verifying the alignment of said superstructure relative to the vehicle, adjustment means disposed in the vicinity of each end of the superstructure for correcting the alignment of said superstructure by sideways displacement thereof relative to the load-handling platform, and connection means between the superstructure and the load-handling platform comprising a pivot and an associated transverse guide member, said connection means allowing the superstructure to move sideways and/or to rotate in a substantially horizontal plane, said sighting, adjustment, and connection means ensuring accurate positioning of transferred loads without requiring any guidance equipment to be provided on the vehicle floor, and locking means are provided in the vicinity of the front ends of at least some of the moving assembly, thereby enabling front ends of adjacent teeth to be interconnected.

23. A device according to claim 22, characterized by the fact that the locking means are articulated hooks controlled by means of hydraulic actuators.

24. A device according to claim 23, characterized by the fact that the hooks are movable in a plane essentially parallel to the superstructure, and serve to lock the teeth in pairs.

* * * * *